May 11, 1943.  J. H. DORAN  2,318,990
RADIAL FLOW ELASTIC FLUID TURBINE OR COMPRESSOR
Filed June 10, 1942
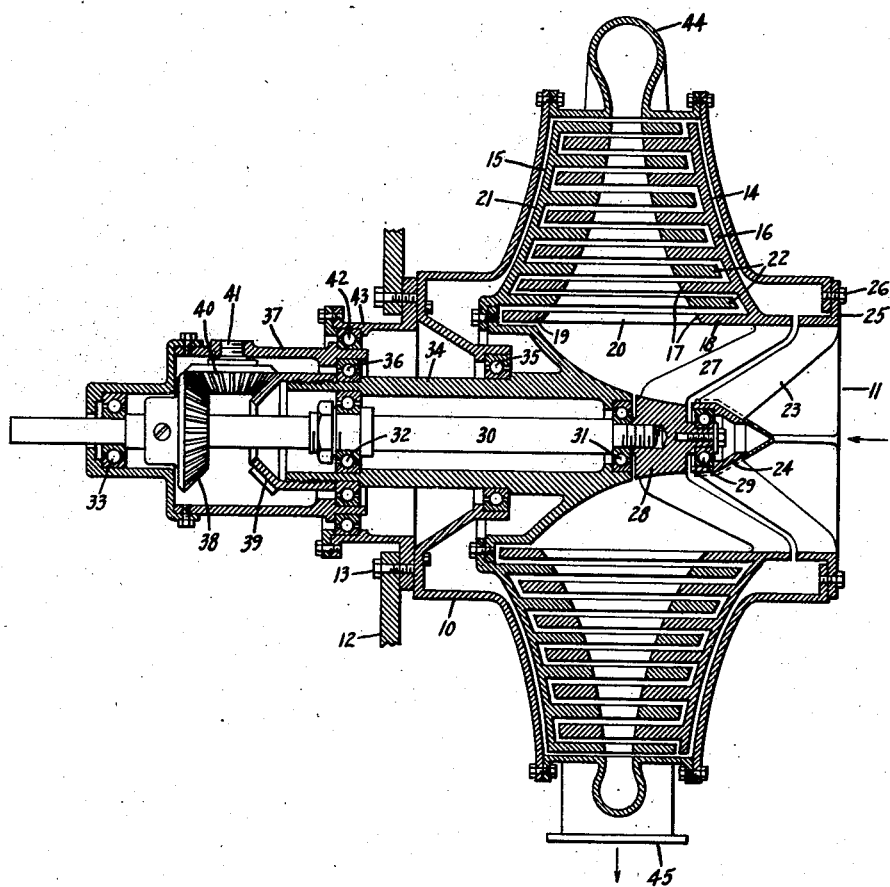
Inventor:
John H. Doran,
by Harry E. Dunham
His Attorney.

Patented May 11, 1943

2,318,990

UNITED STATES PATENT OFFICE 2,318,990

RADIAL FLOW ELASTIC FLUID TURBINE OR COMPRESSOR

John H. Doran, Scotia, N. Y., assignor to General Electric Company, a corporation of New York Application June 10, 1942, Serial No. 446,412

1 Claim. (Cl. 253—16.5)

The present invention relates to radial flow elastic fluid turbines or compressors including a plurality of successive rings of buckets or vanes with adjacent rings of buckets secured to separate shafts rotating in opposite directions.

The object of my invention is to provide an improved construction of radial flow turbines and compressors of the type above specified.

For a consideration of what I believe to be novel and my invention, attention is directed to the following description and the claim appended thereto in connection with the accompanying drawing.

The single figure of the drawing illustrates a radial flow compressor embodying my invention.

The arrangement comprises a casing 10 with an inlet opening 11 secured to a rigid support 12 by a plurality of bolts 13. Two rotors 14 and 15 are disposed within the casing. The rotor 14 has a side wall 16 with a plurality of radially spaced rings of buckets 17 rigidly supported thereon. Each ring of buckets 17 comprises end rings 18, 19 with vanes or bucket blades 20 having end portions held between the axially spaced end rings 18, 19. The rotor 15 similarly has a side wall 21 located on the opposite side from that of the side wall 16 and a plurality of radially spaced rings of buckets 22 alternating with the rings of buckets 17.

During operation, fluid, such as air, to be compressed is conducted from the inlet 11 to the first ring of buckets or vanes 17 by a stationary spider having guide vanes 23 with inner ends secured to a hub 24 and outer ends fastened to a ring 25 held on the casing 10 by bolts 26. The medium is directed from the guide vanes 23 to the bucket blades 20 by another set of vanes 27 having outer ends secured to the disk 16 and inner ends secured to a hub 28. One end of the hub 28 is supported on the first mentioned hub 24 by ball-bearings 29. The other end of the hub 28 is secured to a shaft 30 rotatably supported on ball-bearings 31, 32 and 33. The shaft 30 together with the hub 28 and the spider 27 constitute a means for rotatably supporting the first rotor 14.

The disk 21 of the second rotor 15 has an inner portion secured to a hollow shaft 34 concentrically spaced from the shaft 30. The bore of the hollow shaft 34 acts as a support for the aforementioned bearings 31 and 32. The shaft 34 in turn is supported by ball-bearings 35 and 36. The ball-bearing 35 is held on the casing 10 while the ball-bearing 36 is held on a housing 37. The two shafts, the inner shaft 30 and the outer hollow shaft 34, according to my invention are connected by a gearing. In the present example a beveled gear 38 is fastened to the inner shaft 30 and another beveled gear 39 is fastened to the outer shaft 34. The gear 39 has a hollow shaft portion screwed onto a threaded end portion of the hollow shaft 34. The beveled gears 38, 39 are connected by a third beveled gear 40 with a shaft 41 rotatably supported on the housing 37 and arranged perpendicular to the shaft 38, 39. The housing 37 forms a support for the aforementioned bearing 36 and in turn is supported by a ball-bearing 42 on a cylindrical extension or bracket 43 secured to the housing 10 by the bolts 13. Thus, the housing 37 is supported for rotation about the shafts 30, 34.

During operation of the arrangement as a compressor, air or like medium is forced or induced through the inlet 11 of the casing, whence it is directed by the stationary vanes 23 and the rotatable vanes 27 towards the impeller vanes 20 of the first compressor stage. The fluid is forced radially outward and thereby compressed by the vanes 20. The fluid discharged from the first stage vanes 20 is conducted into the second stage or ring of vanes formed by the first ring of vanes of the second rotor 15. The fluid is thus successively compressed in the successive stages formed by the two rotors until it is finally discharged from the last stage formed by the second rotor 15 into a discharge scroll 44 formed by the casing 10 and having a discharge conduit 45 for conducting the compressed medium to a consumer. During such operation one of the shafts, in the present instance the shaft 30, is driven by a motor or power agency. As long as the resistances to be overcome by the two rotors 14 and 15 are substantially equal the two rotors rotate in opposite direction with the same velocity and the beveled gear 40 merely acts as a means to connect the shaft 34 through the beveled gear 38 on the shaft 30 to the power agency. If the two rotors require different input or, from another viewpoint, if the resistances to be overcome by them differ, then the two rotors will operate at different speeds. During such operation the gear 41 rotates about its own axis and also about the axis of the shafts 30, 34, that is, the housing 37 rotates about the shafts 30, 34. With such arrangement the compressor may be operated with high efficiency and economy.

This also applies during operation of the arrangement as an elastic fluid turbine. During such operation elastic fluid may be conducted to the scroll 44 on its passage through the several stages towards the exhaust opening 11. The fluid causes rotation of the two rotors in opposite direction. The torque of the second rotor 15 is transmitted through the gearing to the lefthand end of the inner shaft 30. The particular gearing as described above permits operation of the two rotors at different speeds, more particularly at speeds at which each rotor attains its optimum efficiency.

During turbine operation, as described above, the elastic fluid is conducted through the conduit 45 to the scroll 44 and discharged from the casing opening 11. An arrangement of this kind may also be operated as a turbine with the casing opening 11 acting as an inlet for receiving elastic fluid under pressure and the conduit 45 acting as exhaust conduit for elastic fluid.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

Radial flow elastic fluid turbine or compressor comprising a casing, two rotors each having a shaft for rotation in opposite directions disposed within the casing, one of the shafts concentrically surrounding the other shaft, and beveled gear means connecting the shafts and comprising a first and a second beveled gear each secured to one of the rotor shafts and a third beveled gear meshing with the first and second gears, and means rotatable about the rotor shafts for supporting the third beveled gear.

JOHN H. DORAN.